Figure 1:
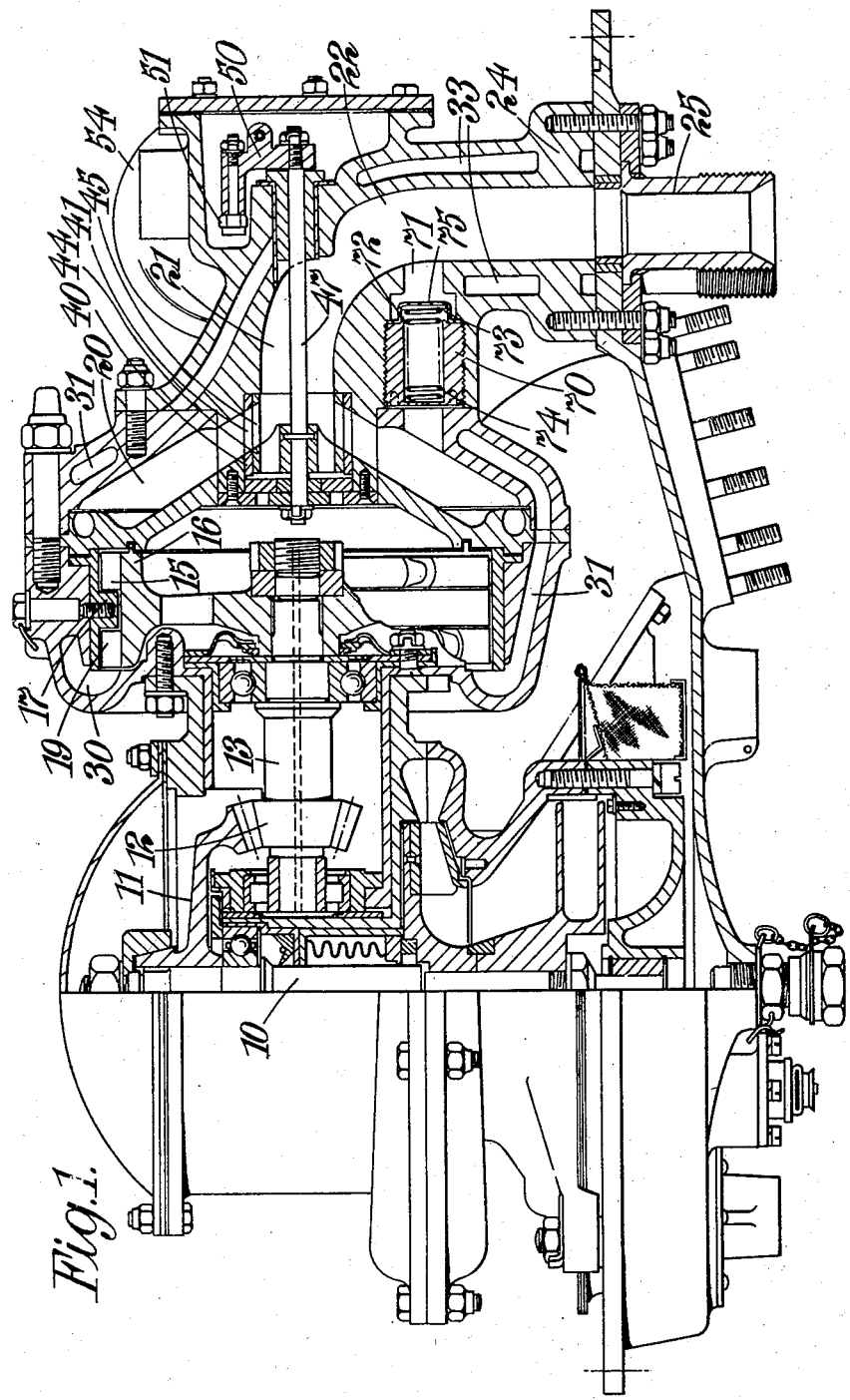

March 31, 1959  G. C. MEREDEW ET AL  2,879,716
CONTROL MEANS FOR MOTOR DRIVEN PUMPS
Filed April 12, 1954  4 Sheets-Sheet 1

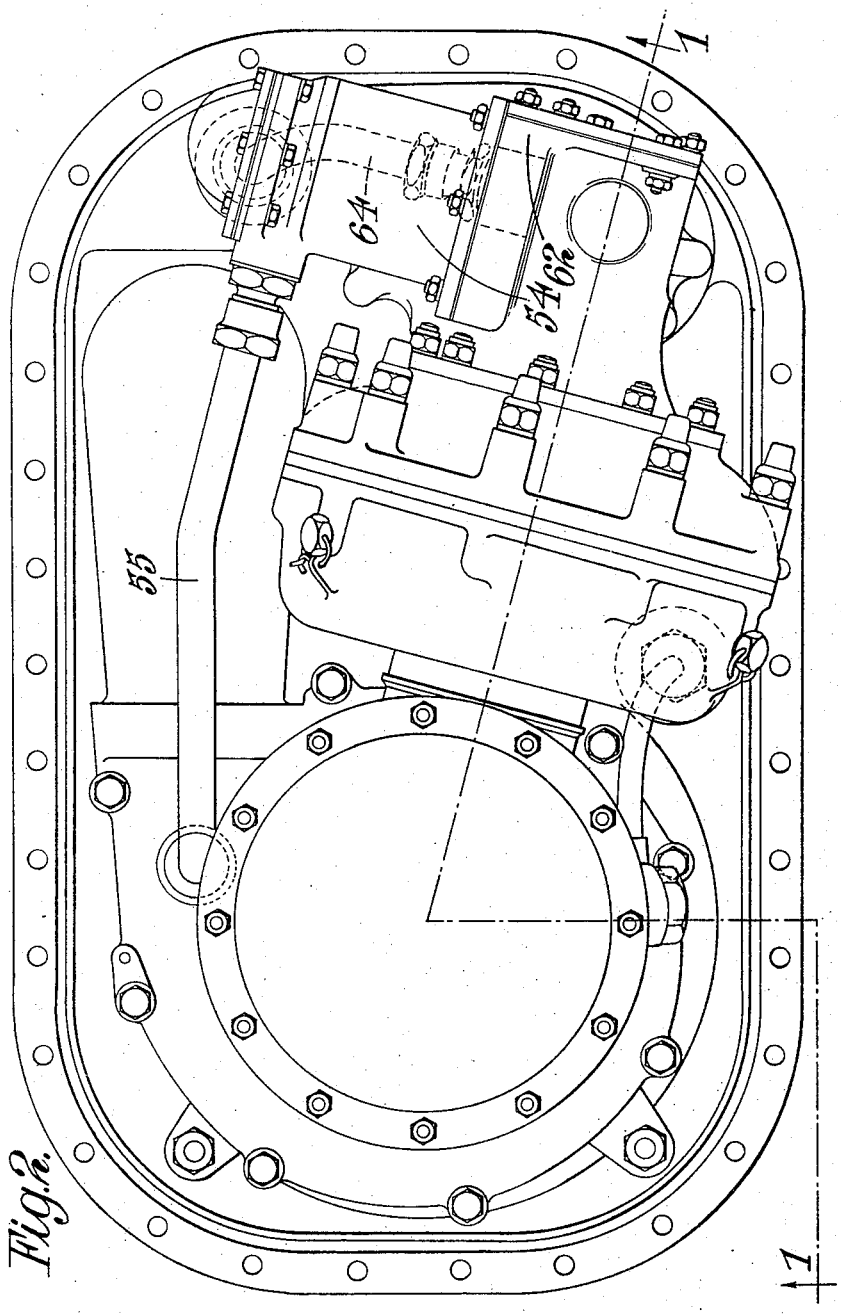

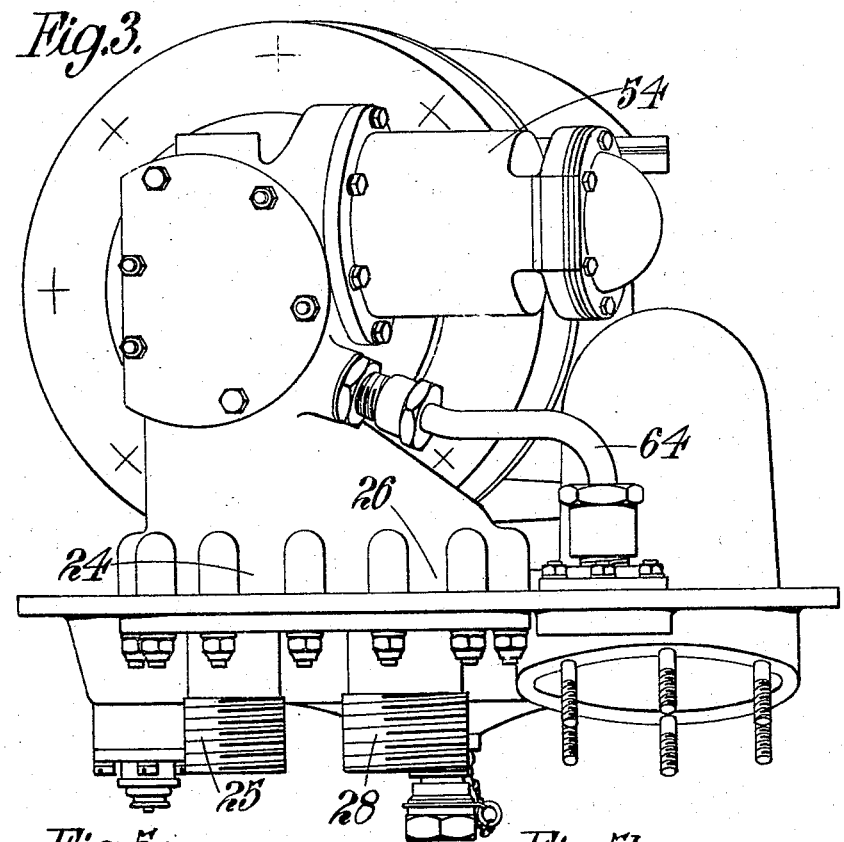
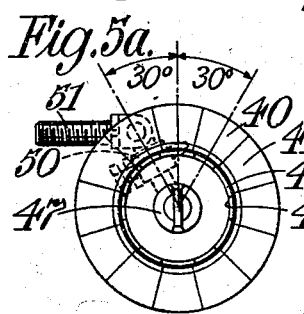
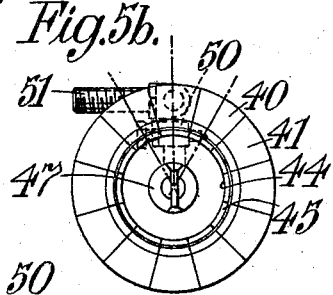
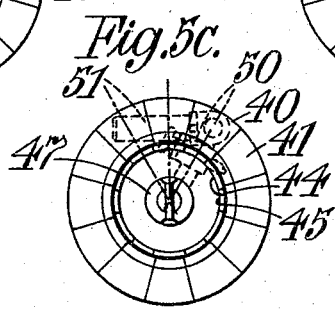

United States Patent Office
2,879,716
Patented Mar. 31, 1959

2,879,716

CONTROL MEANS FOR MOTOR DRIVEN PUMPS

George Charles Meredew and Allan George Edward Moore, London, and Frederick Edward Samuel Smedley, Beeston, England, assignors to Bernard Bercovitz, Toronto, Ontario, Canada, and Rolls-Royce Limited, Derby, England, a British company Application April 12, 1954, Serial No. 422,584

Claims priority, application Great Britain April 16, 1953

11 Claims. (Cl. 103—16)

The invention relates to the control of motor-driven pumps of the kind in which the pump produces a pressure difference which varies with the motor speed, and has for an object the provision of means for automatically controlling the speed of operation of the motor to maintain a pump pressure within a desired range and also to prevent excess speed should the pump pressure fail, for example due to lack of fluid to be pumped. The term "motor" is used herein to include turbines, internal combustion engines, electric motors and the like, which are dependent upon a supply of an operating medium (e.g. a gaseous or liquid fuel or electricity) and upon the load for their speed of operation and the term "pump" is used in its broad sense to include devices producing liquid or gaseous, positive or negative, differences in pressure. The invention is primarily applicable to arrangements in which the pump constitutes the principal load for the motor.

The invention provides a motor-driven pump of the above kind having a pressure-responsive device operable by the variations in the pressure difference and means (e.g. a valve, rheostat or other device) for controlling the supply of operating medium to the motor operable by, or under the control of, the pressure-responsive device to restrict or to cut off the supply if the pressure difference has a value ($P_1$) below a predetermined value ($P_2$) which is below the working pressure difference range ($P_3$ to $P_4$) desired, to increase the supply as the pressure difference rises to the predetermined value ($P_2$), to maintain the supply as the pressure difference rises to the value $P_3$ and then to reduce the supply as the pressure difference increases over the working range, $P_3$ to $P_4$.

In one form of the invention the means for controlling the supply of the operating medium has a progressive operating movement over a range from an "off" position (not necessarily fully "off" and corresponding to the pressure difference $P_1$) to a fully "on" position (corresponding to the pressure difference range $P_2$ to $P_3$) and over a further range towards an "off" position (corresponding to the pressure difference range $P_3$ to $P_4$).

When the operating medium is a gas or a liquid the control means may be a valve or a combination of valves. In one construction of the invention there is employed a valve which is in two parts arranged for relative rotation, one of the parts having one or more ports and the other being so arranged that during relative rotation in the same sense it first uncovers the port or ports and then gradually re-covers the port or ports. The two parts may be of cylindrical or other arcuate form generated by rotation of a line around an axis, the two parts mating one within the other and having ports in their arcuate surfaces which move into and out of register on relative rotation.

It is preferred that in the first-mentioned "off" position of the valve or other means for controlling the supply of operating medium, flow of sufficient of the medium to start the motor is permitted.

In one form of the invention the pressure-responsive device is a flexible bellows, a diaphragm and chamber or a piston and cylinder and it has a spring or springs acting in opposition to the pressure and offering substantially greater resistance to movement over the working range, $P_3$ to $P_4$, than over the range below the value $P_2$. There may be two springs, one a weak spring resisting movement over the range below the predetermined value and the other a stronger spring arranged to come into operation and to offer greater resistance over the range $P_3$ to $P_4$.

It is a feature of the invention that if the pump fails to produce pressure due for example to shortage of liquid or to failure of the pump itself or to fracture of the discharge line, then there will be no pressure difference to operate the pressure-responsive device and the valve or other means controlling the supply of the operating medium will remain in the first-mentioned "off" position or will move to that position and excess engine speed, resulting from the absence of the pump load, will be prevented.

Figure 4:
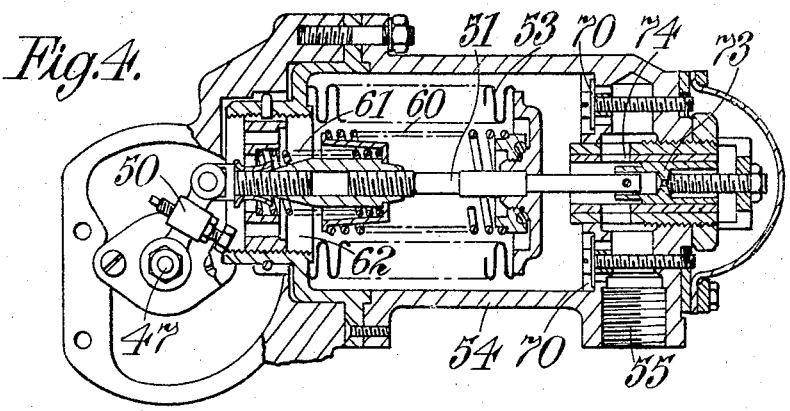

One specific construction of a motor driven pump with control means according to the invention and a modification thereof will now be described, by way of example and with reference to the accompanying drawings, in which:

Figure 1 is a part section and part elevation of the pump unit on the line 1—1 in Figure 2, Figure 2 is a plan view of the pump unit, Figure 3 is an end view of the turbine end of the unit, Figure 4 is a section through a part of the governor, Figures 5A, 5B and 5C are diagrams illustrating three positions of the air control valve, and Figures 6A, 6B, 6C, 6D and 6E are diagrams illustrating five positions of the air control valve of a modified construction.

The subject of this example is a fuel pump for use in an aircraft fuel system and driven by a compressed-air-driven turbine. The pump which is of the centrifugal type and forms no part of the present invention, has a normally vertical spindle 10 which is driven through gearing 11, 12 from the turbine spindle 13 which is normally horizontal. The turbine is arranged for axial flow of the air in the direction towards the pump and has an annular ring of nozzles (not seen in the drawings) which direct the air onto the first row of blades 15 on the turbine wheel 16, a fixed ring of blades 17 through which the air passes after leaving the blades 15, and a second row of blades 19 onto which the air is then directed. The turbine casing is formed with an annular conduit 20 leading to the ring of nozzles and provided with an axial inlet 21 on the side of the casing remote from the pump. This inlet is connected through a right-angle elbow 22 to a fitting 24 for attachment to the bottom wall of the tank and for connection through the bottom to an air supply pipe fitting 25.

At the outlet end of the turbine the casing provides an annular ring 30 for the exhaust air which diverts the air through 180° outwardly into a shroud 31 around the turbine and around the air inlet 21. The shroud leads to an outlet elbow 33 which surrounds the inlet elbow 22 and is connected to the fitting 24. At this fitting the exhaust shroud has a sideways extension 26 which is connected to an independent exhaust outlet pipe fitting 28 outside the tank.

Within the air inlet there is an air-control valve which consists of a fixed outer cylindrical sleeve 40 coaxial with the air inlet 21 and having ports 41 in its circumferential surface leading through the conduit 20 to the turbine nozzles. Inside the outer sleeve 40 there is a valve member in the form of an inner sleeve 44 having ports 45 movable, by rotation of the sleeve 44, into and out of register with the ports 41 in the outer sleeve. The inner sleeve 44 is supported on a central spindle 47 carried in bearings and the arrangement is that on rotation of the inner sleeve through a small angle (in this example 60°), the ports 41 in the outer sleeve are first gradually uncovered and then gradually re-covered. Figures 5A, 5B and 5C show, respectively, the ports 41 covered by the inner sleeve, the ports uncovered by registration with the ports 45 and the ports 41 re-covered by the inner sleeve 44.

Outside the air inlet conduit 21, the spindle 47 carrying the inner sleeve 44 has a radial arm 50 which is attached by a push rod 51 to a collapsible bellows 53 inside a chamber 54 which is connected to the pump output through a pipe 55.

There are two pre-loaded springs 60, 61 within the bellows both tending to resist collapsing movement of the bellows under pressure admitted to the chamber 54 outside the bellows. The spring 60 is much stronger than the spring 61 and is pre-loaded to a much greater extent. The arrangement accordingly is that admission of quite a low pressure to the chamber 54 around the bellows causes collapse of the bellows to compress the light spring 61 but substantially greater pressure is required to effect further collapse of the bellows. Such collapsing movement effects rotation of the inner valve sleeve 44 and the arrangement is that compression of the light spring 61 corresponds to movement of the sleeve 44 to uncover the ports (i.e. from the position shown in Figure 5A to that shown in Figure 5B) and during the subsequent compression of the heavier spring 60 the sleeve moves to re-cover the ports (i.e. to the position shown in Figure 5C). The inside of the bellows forms part of a closed compartment 62 containing the springs, the push rod and the radial arm. The compartment has a connection 64 open to the fuel tank.

In order to provide sufficient air to start the turbine when the ports 41 are closed by the inner sleeve, the air control valve may be arranged to leak to allow enough air to pass or there may be a bleed around the valve but it is preferred that a by-pass valve 70 be provided as shown in Figure 1. This valve 70 is located in a passageway 71 between the air inlet elbow 22 and the conduit 20 by-passing the air control valve. The by-pass valve 70 comprises a valve disc 72 which is urged away from a valve seat 73 by a light spring 74. A cage 75 limits the movement of the disc 72. When the air supply is turned off the disc 72 is held off the seat 73 by the spring 74. Accordingly when the air is turned on to start the turbine it is able to pass through the by-pass. The valve remains open until a pressure difference across the valve of about 5 lbs. per square inch is reached. The valve then closes under the air pressure.

In the operation of the pump and turbine, when the turbine is stationary there is no pump pressure and the air control valve is in the "off" position (i.e. the ports 41 are covered). If the air (i.e. the operating medium) is now turned on sufficient passes the valve (i.e. through the by-pass 71) to start the turbine which causes the pump to produce a low pressure sufficient to start the collapsing movement of the bellows against the light spring 60. This opens the air control valve slightly and so admits further air to the turbine which results in increased speed, the development of further pump pressure and further opening of the valve, which cycle continues until the pump pressure reaches the predetermined value aforesaid when the light spring 60 is fully compressed and the valve fully opened (i.e. the ports 41 are uncovered as shown in Figure 5B).

The valve remains in this position during further increase in turbine speed and pump output pressure, but before the pressure reaches the desired normal value, the bellows begins a further collapsing movement against the stiffer spring 61 and the valve begins to move towards the second "off" position (Figure 5C).

When the turbine has reached a speed sufficiently fast to produce the normal pump output pressure, the bellows has been further collapsed against the stiffer spring 61 and the valve has been moved to an intermediate position towards the second "off" (Figure 5C) position which restricts the air flow and so maintains the desired output pressure. If the pressure rises above the desired normal value the valve is closed still further whereas if the pressure falls the valve is moved towards the open position. If, for any reason, the output pressure fails completely, for example due to exhaustion of the fuel, then the springs move the bellows to the fully extended (Figure 5A) position and so return the valve to the first "off" position. In this position there is, however, sufficient air flow through the by-pass to maintain the turbine running at a safe speed.

In order to prevent the governor from hunting there is provided in the connection 55 from the pump output to the chamber 54 two automatic flexible disc non-return valves 70 and a piston valve in parallel relation. The piston valve, when open, permits free return flow from the chamber and when closed permits return flow at a restricted rate or there is a bleed permitting such restricted rate of flow. The piston valve consists of a piston 73 which is connected to the push rod 51 for movement thereby, as the bellows operate, to cover and uncover ports 74 in a cylinder, the ports leading from the pump output connection 55 to the chamber 54. The arrangement is that when the air valve is in the first "off" (Figure 5A) position the ports 74 are uncovered by the piston 73 and the piston valve is open. When the air valve reaches its fully open (Figure 5B) position the ports 74 are just closed by the piston valve and they remain closed as the air valve continues its movement towards the second "off" (Figure 5C) position.

When the air valve is between the first "off" position and the fully open position, fuel pressure may enter the bellows chambers 54 via the non-return valves 70 or the piston valve ports 74 and may leave via the piston valve ports, with little or no restriction, and the operation of the governor is then rapid in either direction. When the air valve is between the open and second "off" position (i.e. past the Figure 5B position), however, fuel may enter freely into the chamber via the non-return valves 70, but cannot leave except by leakage past the piston or through the bleed so that the air valve may be closed rapidly but can open only slowly, thus preventing hunting.

Figure 6A:
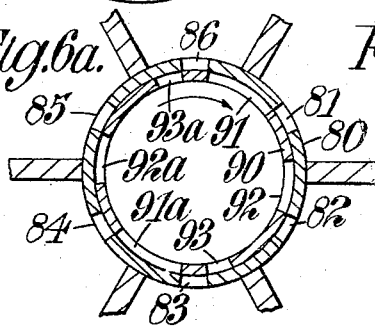
Figure 6B:
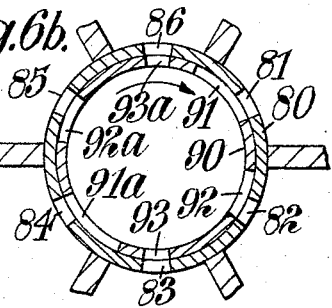
Figure 6C:
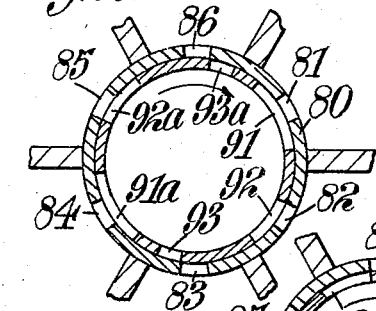
Figure 6D:
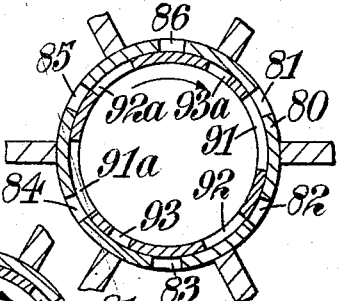
Figure 6E:
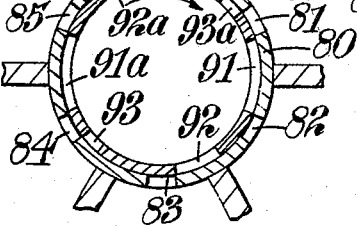

In the above described example, the air control valve operates to vary the supply of air to all the turbine nozzles simultaneously. In an alternative arrangement within the invention, the valve is arranged to operate both by varying the air supply and by varying the number of the nozzles to which air is supplied, and so to improve the efficiency of the turbine by enabling the nozzles in use to operate at or near the expansion ratio for which they were designated. For example the valve may control the nozzles in diametrically opposed pairs and operate first progressively to increase the supply of air to all the nozzles until the fully open position is reached and then, as it approaches the second "off" position, to decrease the number of pairs to which the air is supplied, the air supply to each pair being gradually reduced until the pair is cut off altogether. The diagram Figures 6A to 6E illustrate this arrangement. In this arrangement the outer sleeve 80 has six equally spaced ports 81–86 which lead respectively to six equally spaced turbine nozzles. Partitions 87 serve to isolate the ports and nozzles. The inner sleeve 90 has two sets of ports 91, 91a, 92, 92a and 93, 93a respectively. The ports 91, 91a are three times the width of the ports 93, 93a and the ports 92, 92a are twice the width of the ports 93, 93a. Figure 6A shows the valve in the first "off" position. As the pump pressure increases, the inner sleeve moves to the Figure 6B position (the fully open position) in which all the ports in the outer sleeve are fully opened and air is supplied to all the nozzles. Further increase in pump pressure causes further clockwise rotation of the inner sleeve progressively through the Figures 6C, 6D positions to the Figure 6E position. In the Figure 6C position the two ports 83 and 86 have been closed thereby shutting off two of the nozzles. In the Figure 6D position the ports 83, 86, 82 and 85 have been closed and four nozzles are shut off. In the Figure 6E position all the ports 81–86 are closed and the second "off" position has been reached.

We claim:

1. A pump unit comprising a driving motor of which the speed is variable in accordance with the supply of an operating medium for the motor, a pump in driven relation to the motor operable to produce in a fluid a pressure difference which varies with the motor speed, a pressure-responsive device in fluid communication with said pump and operable by variations in the said pressure difference, and means operatively associated with said device for controlling the supply of operating medium to the motor and movable throughout a range consisting of a first portion in which the supply of operating medium is progressively less restricted as the pressure difference has a value ranging from ($P_1$) to a predetermined value ($P_2$) which is below the working pressure difference range ($P_3$ to $P_4$) desired, a second portion in which the supply of operating medium is substantially unrestricted as the pressure difference rises between the predetermined values ($P_2$ and $P_3$), and a third portion in which the operating medium is again progressively more restricted as the pressure difference increases over the working range ($P_3$ and $P_4$).

2. A pump unit as claimed in claim 1, in which the first range portion constitutes a progressive movement from a substantial "off" position corresponding to the pressure difference $P_1$ to a fully "on" position corresponding to the pressure difference $P_2$, the second range portion constitutes a fully "on" position corresponding to the pressure difference range $P_2$ to $P_3$ and the third range portion constitutes a further range towards an "off" position corresponding to the pressure difference range $P_3$ to $P_4$.

3. A pump unit as claimed in claim 1 in which the operating medium is a fluid and the movable means comprise a valve in a conduit for the fluid, the valve being composed of two parts arranged for relative rotation, one of the parts having a least one port, and the other part being so arranged that during relative rotation in the same sense it first uncovers the port and then gradually re-covers the port.

4. A pump unit as claimed in claim 3 in which the two parts are of arcuate form generated by rotation of a line around an axis, the two parts mating one within the other and having ports in their arcuate surfaces which move into and out of register on relative rotation.

5. A pump unit as claimed in claim 1, in which the pressure-responsive device embodies spring means acting in opposition to the pressure and offering substantially greater resistance to movement over the third range portion than over the second range portion.

6. A pump unit as claimed in claim 5, in which the spring means comprise two springs, one a weak spring resisting movement over the first and second range portions and the other a stronger spring arranged to come into operation and to offer greater resistance over the third range portion.

7. A pump unit as claimed in claim 6, in which the second spring is pre-loaded and there is a range of pressure increase above a predetermined value before the second spring begins to collapse.

8. A pump unit as claimed in claim 1, in which the operating medium is a fluid, in which the movable means embodies a valve and there is a by-pass passage around the said valve and a by-pass valve in said passage biassed towards the open position but arranged to be closed by the operating fluid when the pressure drop across the valve reaches a pre-set value.

9. A pump unit as claimed in claim 1, in which the motor is an air-driven turbine.

10. A pump unit as claimed in claim 9, in which the turbine embodies a group of air nozzles for directing air on to rotor blades and the movable means are operable to vary the number of nozzles to which the air is supplied.

11. A pump unit as claimed in claim 10, in which the movable means are operable progressively to admit air to all the nozzles, as the pressure difference rises to a predetermined value and with increase above that value progressively to reduce the number of nozzles to which air is supplied.

References Cited in the file of this patent

UNITED STATES PATENTS

| | | |
|---|---|---|
| 385,941 | McCarthy | July 10, 1888 |
| 429,570 | Johnson | June 3, 1890 |
| 1,284,662 | Halliwell | Nov. 12, 1918 |
| 2,126,863 | Barton | Aug. 16, 1938 |
| 2,250,865 | Griffin | July 29, 1941 |
| 2,294,975 | Gabalis | Sept. 8, 1942 |
| 2,634,681 | Rowell | Apr. 14, 1953 |
| 2,694,979 | Lauck | Nov. 23, 1954 |
| 2,752,858 | Berges | July 3, 1956 |
| 2,765,619 | Peterson | Oct. 9, 1956 |
| 2,765,804 | Dinkelkamp | Oct. 9, 1956 |
| 2,778,312 | Suttle et al. | Jan. 22, 1957 |

FOREIGN PATENTS

| | | |
|---|---|---|
| 372,196 | Germany | Mar. 24, 1923 |